(12) United States Patent
Rittenhouse (10) Patent No.: US 9,964,988 B2
(45) Date of Patent: May 8, 2018

(54) HINGE CLIP

(71) Applicant: Intel Corporation, Santa Clara, CA (US)

(72) Inventor: David A. Rittenhouse, Fair Oaks, CA (US)

(73) Assignee: Intel Corporation, Santa Clara, CA (US)

( * ) Notice: Subject to any disclaimer, the term of this patent is extended or adjusted under 35 U.S.C. 154(b) by 82 days.

(21) Appl. No.: 14/978,695

(22) Filed: Dec. 22, 2015

(65) Prior Publication Data

US 2017/0177026 A1    Jun. 22, 2017

(51) Int. Cl.
*G06F 1/16* (2006.01)
*E05D 3/12* (2006.01)
*E05D 11/08* (2006.01)
*E05D 5/14* (2006.01)

(52) U.S. Cl.
CPC ............ *G06F 1/1616* (2013.01); *E05D 3/12* (2013.01); *E05D 5/14* (2013.01); *E05D 11/082* (2013.01); *G06F 1/1681* (2013.01); *E05D 2005/145* (2013.01); *Y10T 16/547* (2015.01)

(58) Field of Classification Search
CPC ............ G06F 16/1616; G06F 16/1618; G06F 16/1681; H05K 5/0226; H04M 1/0214; H04M 1/0216; H04M 1/022; E05Y 2900/606; E05D 3/12; E05D 5/14; E05D 11/082; E05D 2005/145; Y10T 16/547; Y10T 16/5474; Y10T 16/5475; Y10T 16/5403; Y10T 16/54038; Y10T 16/53864

USPC ..... 16/366, 368, 369, 337, 342; 361/679.27; 455/575.3; 379/433.13
See application file for complete search history.

(56) References Cited

U.S. PATENT DOCUMENTS

| | | | | |
|---|---|---|---|---|
| 5,325,984 A * | 7/1994 | Ady | ................... | B65D 43/165 220/817 |
| 5,632,066 A * | 5/1997 | Huong | ................. | G06F 1/1616 16/338 |
| 5,682,645 A * | 11/1997 | Watabe | ................. | G06F 1/1616 16/338 |
| 6,154,359 A * | 11/2000 | Kamikakai | .......... | G06F 1/1618 16/342 |
| 8,732,908 B2 * | 5/2014 | Hatano | ................. | E05D 11/082 16/342 |
| 9,563,236 B2 * | 2/2017 | Rittenhouse | .......... | G06F 1/1618 |
| 2001/0016969 A1 * | 8/2001 | Fujita | .................... | G06F 1/1616 16/342 |
| 2003/0172497 A1 * | 9/2003 | Cha | ........................ | E05D 11/082 16/342 |
| 2004/0134033 A1 * | 7/2004 | Raines | ............... | G02B 27/0149 16/342 |
| 2004/0194256 A1 * | 10/2004 | Chen | ........................ | G06F 1/162 16/366 |
| 2006/0238970 A1 * | 10/2006 | Ukonaho | .............. | H04M 1/022 361/679.01 |
| 2011/0072620 A1 * | 3/2011 | Wang | .................... | G06F 1/1681 16/342 |

(Continued)

*Primary Examiner* — William Miller
(74) *Attorney, Agent, or Firm* — Patent Capital Group (57) ABSTRACT

Particular embodiments described herein provide for an device that includes a first body coupled to a first housing, a second body coupled to a second housing, a hinge rod, and a spring clip on an outside diameter of the hinge rod, where the spring clip is configured to increase the torque of the hinge.

11 Claims, 8 Drawing Sheets

(56) References Cited

U.S. PATENT DOCUMENTS

| | | | |
|---|---|---|---|
| 2011/0099761 A1* | 5/2011 | Wang | G06F 1/1681 |
| | | | 16/339 |
| 2011/0147398 A1* | 6/2011 | Ahee | G06F 1/1626 |
| | | | 220/810 |
| 2011/0154614 A1* | 6/2011 | Chien | E05D 11/1014 |
| | | | 16/297 |
| 2013/0111704 A1* | 5/2013 | Mitsui | H04M 1/022 |
| | | | 16/250 |
| 2013/0135809 A1* | 5/2013 | Uchiyama | G06F 1/1681 |
| | | | 361/679.09 |
| 2013/0170108 A1* | 7/2013 | Lin | G06F 1/1618 |
| | | | 361/679.01 |
| 2013/0318746 A1* | 12/2013 | Kuramochi | G06F 1/1681 |
| | | | 16/342 |
| 2013/0322004 A1* | 12/2013 | Park | F16C 11/10 |
| | | | 361/679.27 |
| 2013/0342974 A1* | 12/2013 | Hung | G06F 1/1681 |
| | | | 361/679.01 |
| 2014/0033477 A1* | 2/2014 | Wang | G06F 1/1681 |
| | | | 16/376 |
| 2014/0338483 A1* | 11/2014 | Hsu | F16H 21/44 |
| | | | 74/96 |
| 2015/0245511 A1* | 8/2015 | Hsu | E05D 3/122 |
| | | | 74/63 |
| 2015/0309539 A1* | 10/2015 | Kamphuis | G06F 1/1681 |
| | | | 361/679.27 |
| 2016/0010375 A1* | 1/2016 | Rittenhouse | G06F 1/1683 |
| | | | 361/679.27 |

* cited by examiner

HINGE CLIP

FIELD OF THE DISCLOSURE

Embodiments described herein generally relate to the field of hinges, and more particularly, to a hinge clip for a wrap end hinge.

BACKGROUND

End users have more electronic device choices than ever before. A number of prominent technological trends are currently afoot (e.g., more computing devices, more devices that can change into different configurations, etc.), and these trends are changing the electronic device landscape. One of the technological trends is a hybrid laptop (e.g., a convertible computer, fold over notebook, etc.). A hybrid laptop, is a one-piece mobile computer that can include a laptop configuration and a tablet configuration. To convert from the laptop configuration to the tablet configuration, often the display or screen can rotate, twist, or spin over a keyboard. Some of these devices, and other devices have wrap end hinges. Unfortunately, existing wrap end hinges have no means to maintain constant torque over time. The wrap end material is usually a stamped steel sheet material with low strength and typically, only a little amount of spring force can be applied to the hinge axle.

BRIEF DESCRIPTION OF THE DRAWINGS

Embodiments are illustrated by way of example and not by way of limitation in the FIGURES of the accompanying drawings, in which like references indicate similar elements and in which.

The FIGURES of the drawings are not necessarily drawn to scale, as their dimensions can be varied considerably without departing from the scope of the present disclosure.

DETAILED DESCRIPTION OF THE EMBODIMENTS

Example Embodiments

The following detailed description sets forth example embodiments of apparatuses, methods, and systems relating to a wrap end hinge. Features such as structure(s), function(s), and/or characteristic(s), for example, are described with reference to one embodiment as a matter of convenience; various embodiments may be implemented with any suitable one or more of the described features.

The foregoing is offered by way of non-limiting examples in which the system and method of the present specification may usefully be deployed. The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In the examples of the present specification, a system and method is provided for wrap end hinge design. In one example, a spring clip installed over the outside of conventional wrap end hinge designs can allow for high torque to be maintained over the life of the hinge. Some existing designs for wrap end hinges can become loose over time. The spring clip and wrap end hinge assembly can help to improve wrap end style spring yield rates in production and lower overall hinge cost by reducing scrap. The spring clip can also allow hinge manufactures to adjust the hinge torque after assembly by using a cylindrical spring clip with the proper force.

The following is an illustration of an example of a spring clip hinge design according to one or more example embodiments of the present specification. It should be noted that the spring clip designs disclosed here are given as non-limiting examples only, and it is intended that any suitable technique or configuration should be included in the broad scope of this specification.

Figure 1A:
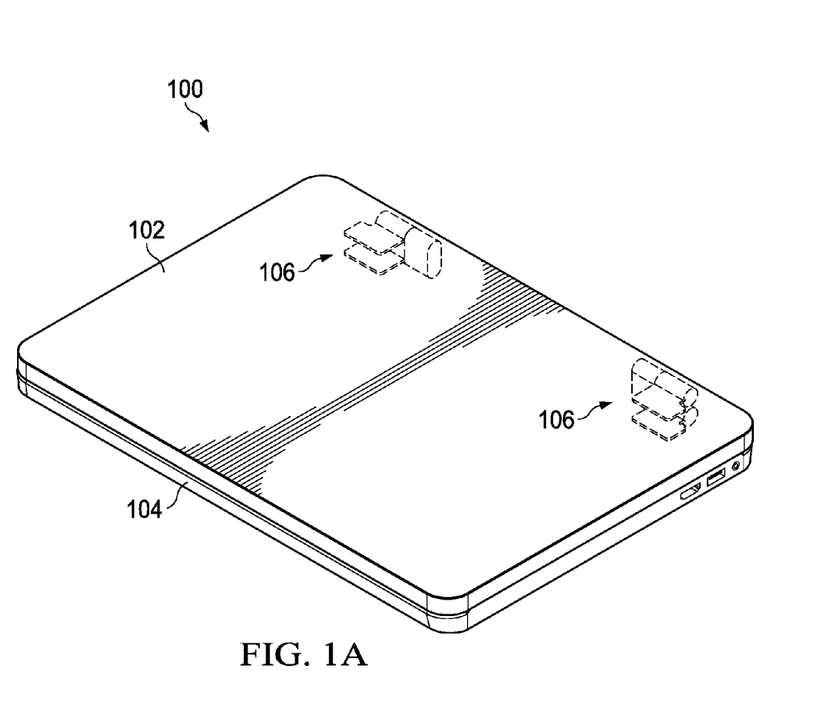
FIG. 1A is a simplified orthographic view illustrating an embodiment of an electronic device in a closed landscape clamshell configuration, in accordance with one embodiment of the present disclosure.

Turning to FIG. 1A, FIG. 1A is a simplified orthographic view illustrating an embodiment of an electronic device 100 in a closed clamshell configuration in accordance with one embodiment of the present disclosure. Electronic device 100 may include a first housing 102, a second housing 104, and a hinge 106. Hinge 106 can define an axis of rotation that is shared between first housing 102 and second housing 104. Hinge 106 may be a wrap end hinge. Hinge 106 may also be a low-profile hinge. The term low-profile hinge includes a hinge with a low, flat, or relatively flat profile with a low total z-height. As used throughout this Specification, the z-height is the height on the z axis of an X, Y, Z Cartesian coordinate system.

In one or more embodiments, electronic device 100 is a notebook computer or laptop computer. In still other embodiments, electronic device 100 may be any suitable electronic device having a display and a hinge. In yet another embodiment, most of the electronics (e.g., processor, memory, etc.) for electronic device 100 reside in second housing 104.

Figure 1B:
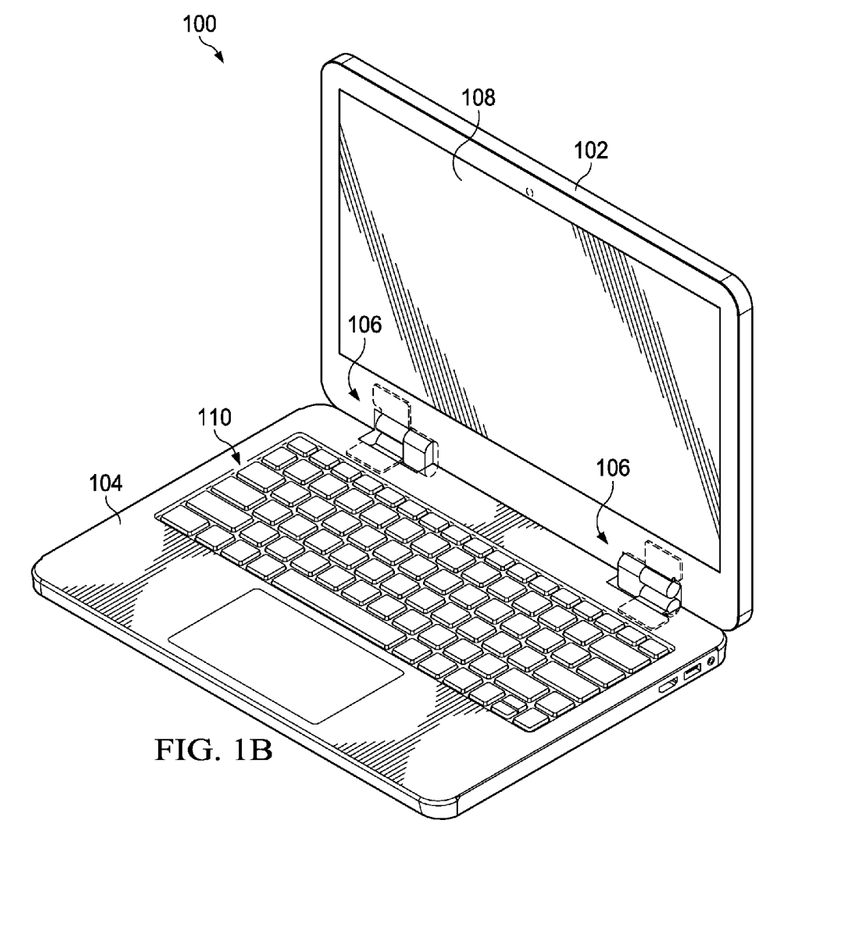
FIG. 1B is a simplified orthographic view illustrating an embodiment of an electronic device in an open clamshell configuration, in accordance with one embodiment of the present disclosure.

Turning to FIG. 1B, FIG. 1B is a simplified orthographic view of electronic device 100 in an open clamshell configuration in accordance with one embodiment of the present disclosure. First housing 102 can include a display 108. Second housing 104 can include a keyboard 110. In one or more embodiments, display 108 can be a liquid crystal display (LCD) display screen, a light-emitting diode (LED) display screen, an organic light-emitting diode (OLED) display screen, a plasma display screen, or any other suitable display screen system. Display 108 may be a touchscreen that can detect the presence and location of a touch within the display area. In another embodiment, first housing 102 may include a camera, a microphone, and speakers.

In one or more embodiments, second housing 104 can function as an input device and may include keyboard 110. Keyboard 100 may be a mechanical keyboard, touch screen, input area, etc. The touch screen can detect the presence and location of a touch within the touch screen area. In one example, the touch screen can be configured to allow for the input of letters, numbers, characters, functions, etc. similar to a mechanical keyboard and the touch screen may be used in place of (or instead of) a mechanical keyboard. In another example, the touch screen may supplement a mechanical keyboard and may be configured to operate as a number key pad, design area, function call, or some other similar input area.

In general terms, electronic device 100 may be configured to provide a first housing coupled to a second housing using a wrap hinge. The wrap hinge can be configured with a spring clip that remediates the issue of hinge spring tension relaxing over time as a function of cycling. Also, different force spring clips can be used to control initial torque and friction of the wrap end hinge.

For purposes of illustrating certain example features of electronic device 100, the following foundational information may be viewed as a basis from which the present disclosure may be properly explained. Existing hinges do not have a method or means to maintain constant torque over time. The wrap end material is usually a stamped steel sheet material with low strength and typically, only a little amount of spring force can be applied to the hinge axle. What is needed is a spring clip that can increase and maintain proper torque over time on the axis to meet hinge requirements.

A device as outlined herein can resolve these issues (and others). Particular embodiments described herein provide for a hinge that is configured to include a spring clip. The spring clip can be configured to solve the issue of hinge spring tension relaxing over time as a function of cycling. Also, different force spring clips can be used to control initial torque and friction of a hinge and bring a hinge to tolerance where the hinge may otherwise have been discarded.

In an example, the spring clip can be installed at the supplier. This reduces manufacturing yield loss and therefore can reduce hinge cost. High folder style hinge costs are an issue for convertible and detachable system designs. A cylindrical spring clip on the outside diameter can maintain friction between the regular wrap end flange and the hinge axis. In addition, wrap end hinges usually lose friction after initial use as any high points are worn down. The spring clip can maintain a constant and higher force over time and high number of cycles. Also, different spring clips with different spring force can be used during hinge assembly and test to properly adjust the hinges to meet desired requirements.

Particular embodiments described herein provide for an electronic device, such as a notebook computer, laptop, cellphone, or other mobile device that includes a circuit board coupled to a plurality of electronic components (which includes any type of components, elements, circuitry, etc.). The electronic device may also include a display portion coupled to a keyboard portion at a hinge. The hinge (e.g., hinge 106) can be configured to allow a low-profile 360° hinge design for hybrid electronic devices and 2-in-1 applications. The hinge includes orbiting hinge segments that mechanically attach and interlock to each other and one or more hinge clips. In an example, a low-profile 360° hinge is mechanically connected to first housing 102 and second housing 104 to form electronic device 100.

The hinge can include connectors and mechanical retentions to provide an electrical connection between the display portion and the keyboard portion. In one embodiment, the electrical connections between a motherboard in the keyboard portion and display components in the display portion are formed through conventional wire-connections via the segment components. In another embodiment, a printed circuit board (PCB) interconnector is used to electrically connect the display portion and the keyboard portion. In other examples, electrical current and signals can be passed through a plug-in connector (e.g., whose male side protrusion connects to first housing 102 and whose female side connects to second housing 104 or vice-versa) or a wireless connector (e.g., Wi-Fi, Bluetooth, etc.). Note that any number of connectors (e.g., Universal Serial Bus (USB) connectors (e.g., in compliance with the USB 3.0 Specification released in November 2008), Thunderbolt™ connectors, a non-standard connection point such as a docking connector, etc.) can be provisioned in conjunction with electronic device 100. [Thunderbolt™ and the Thunderbolt logo are trademarks of Intel Corporation in the U.S. and/or other countries.]. Virtually any other electrical connection methods could be used and, thus, are clearly within the scope of the present disclosure.

In an embodiment, the majority of the system components (e.g., motherboard, hard drive, battery, communication modules, etc.) remain in the keyboard portion. In certain embodiments the display can be a touchscreen display. The display portion may also contain a camera module, microphone, speakers, and/or a wireless module. Such a design allows for the electronic device to function in a clamshell configuration or a tablet configuration. In an embodiment, the display includes a plurality of electrical components that allow the display portion to function or operate as a tablet.

Figure 2:
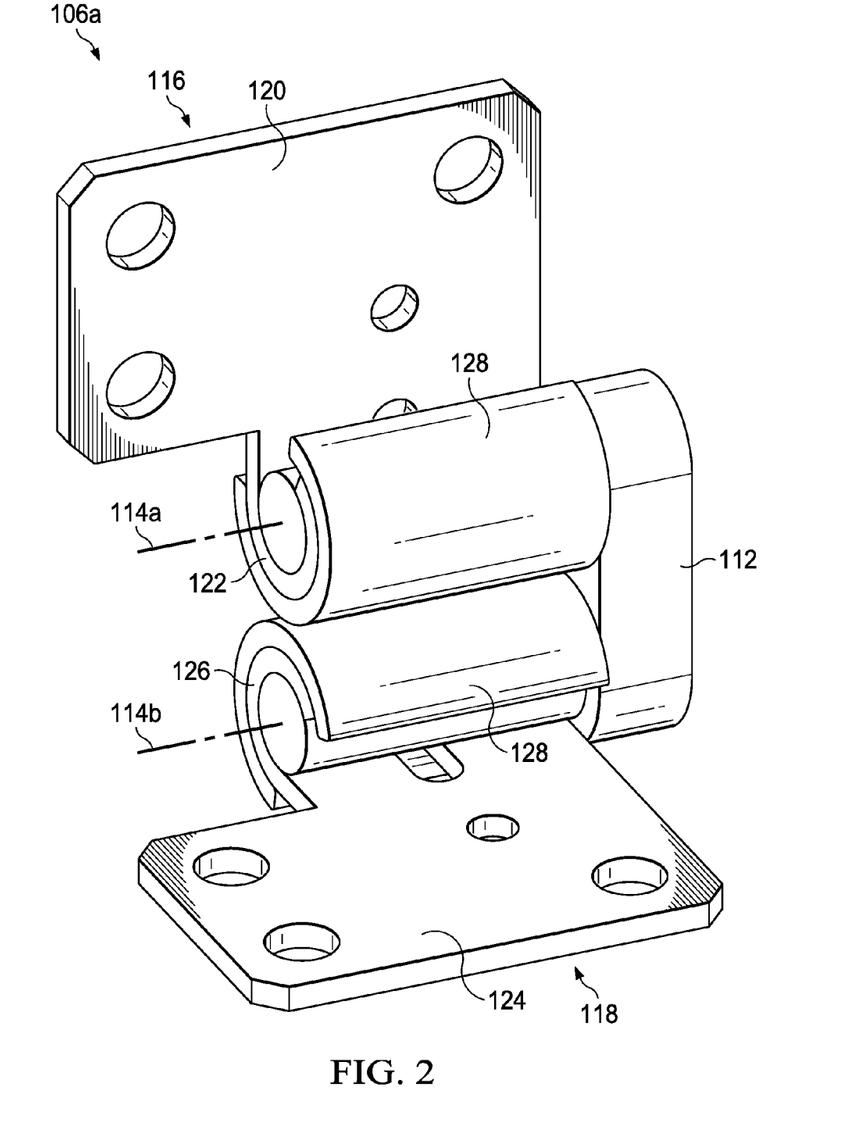
FIG. 2 is a simplified orthographic view illustrating an embodiment of a portion of a hinge, in accordance with one embodiment of the present disclosure.

Turning to FIG. 2, FIG. 2 is a simplified orthographic view illustrating an embodiment of a hinge 106a, in accordance with one embodiment of the present disclosure. Hinge 106a can include hinge rods 114a and 114b, hinge link 112 to link or couple hinge rods 114a and 114b, a first housing attachment means 116, a second housing attachment means 118, and spring clips 128. First housing attachment means 116 can include a first housing attachment plate 120 and a hinge rod coupling portion 122. Second housing attachment means 118 can include a second housing attachment plate 124 and a hinge rod coupling portion 126. Spring clips 128 can be configured to slide over hinge rod coupling portions 122 and 124 and maintain a constant and higher force over time and over a high number of cycles. Different spring clips 128 with different spring force can be used during hinge assembly and test to properly adjust the hinges to meet desired requirements. For example, a spring clip with one degree of spring force can be placed over hinge rod coupling portion 122 while a different spring clip with a different degree of spring force can be placed over hinge rod coupling portion 124.

Figure 3A:
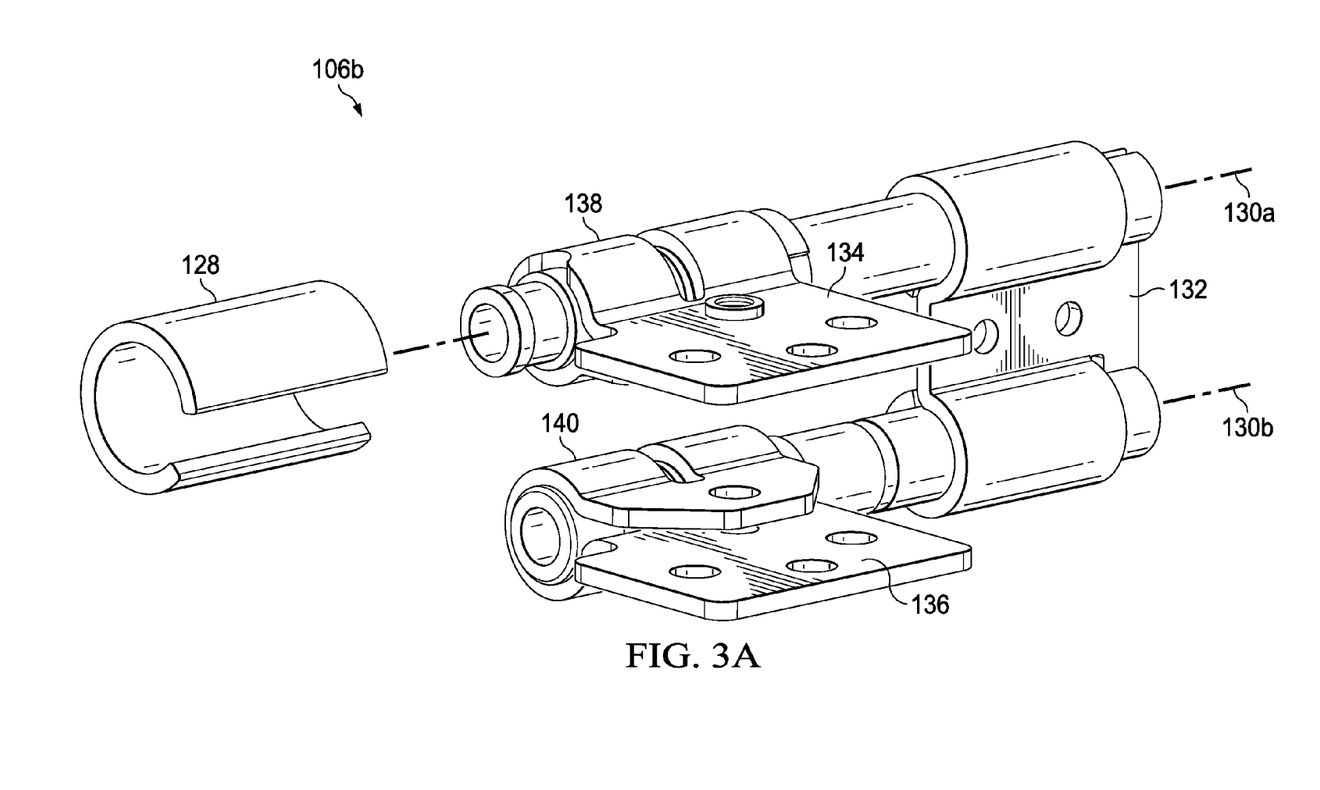
FIG. 3A is a simplified orthographic view illustrating an embodiment of a portion of a hinge, in accordance with one embodiment of the present disclosure.

Turning to FIG. 3A, FIG. 3A is a simplified orthographic view illustrating an embodiment of a portion of a hinge 106B, in accordance with one embodiment of the present disclosure. Hinge 106b can include a first hinge rod 130a, a second hinge rod 130b, hinge rod coupling plate 132, a first housing coupling mechanism 134, and a second housing coupling mechanism 136. A portion of first housing coupling mechanism 134 can include first hinge rod coupling 138 and a portion of second housing coupling mechanism 136 can include second hinge rod coupling 140. In an example, a hinge clip 128 can slide or be positioned over first hinge rod coupling 138.

Figure 3B:
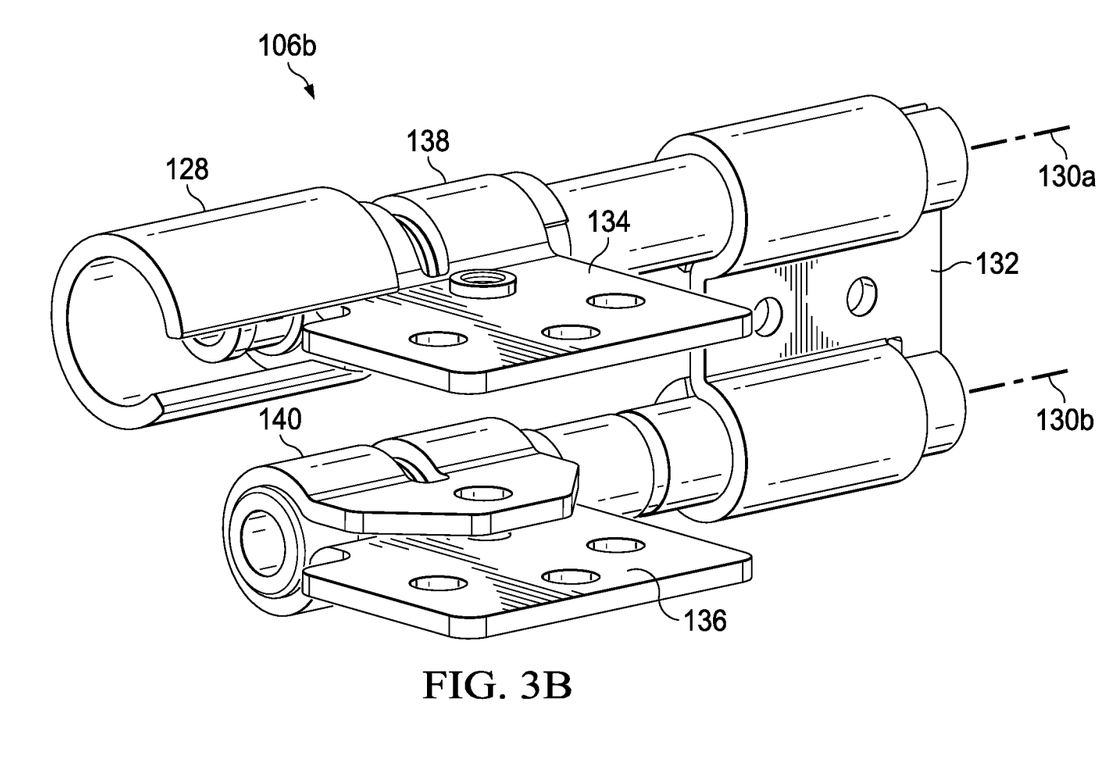
FIG. 3B is a simplified orthographic view illustrating an embodiment of a portion of a hinge, in accordance with one embodiment of the present disclosure.
Figure 3C:
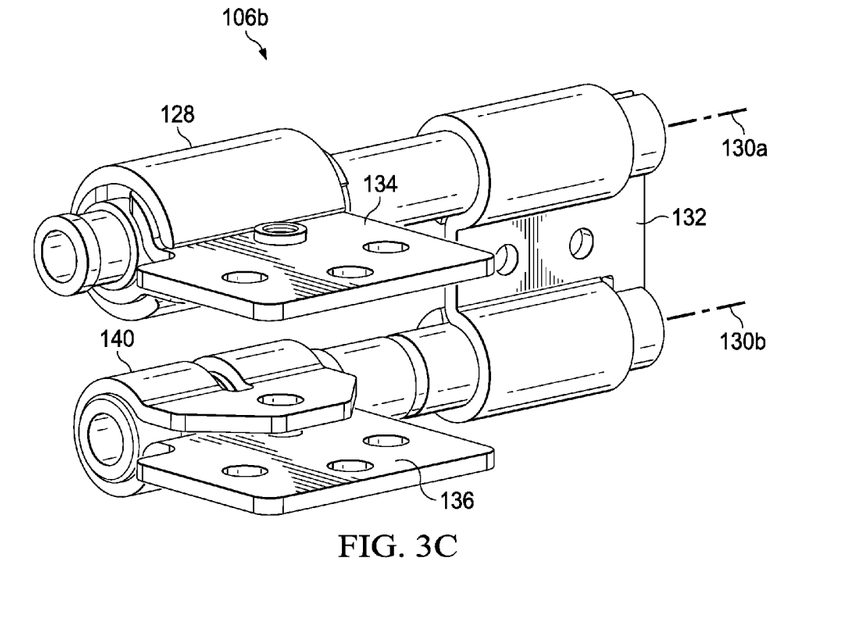
FIG. 3C is a simplified orthographic view illustrating an embodiment of a portion of a hinge, in accordance with one embodiment of the present disclosure.

Turning to FIGS. 3B and 3C, FIGS. 3B and 3C are a simplified orthographic view illustrating an embodiment of a portion of a hinge 106b, in accordance with one embodiment of the present disclosure. As illustrated in FIGS. 3B and 3C, spring clip 128 has slid or been positioned over first hinge rod coupling 138. In an illustrative example, the friction between first hinge rod coupling 138 and first hinge rod 130a may not have been sufficient and outside a preset tolerance. Spring clip 128 can be coupled to first hinge rod coupling 138 to increase the friction and bring hinge 106b to the proper tolerance. In some examples, a spring clip 128 can also be coupled to second hinge rod coupling 140 to further increase the friction.

As can be seen, spring clip 128 is readily installed over the outside diameter of a regular wrap end hinge. The spring clip material properties and material can be changed to meet specific requirements for torque and lifetime cycle testing.

Figure 4A:
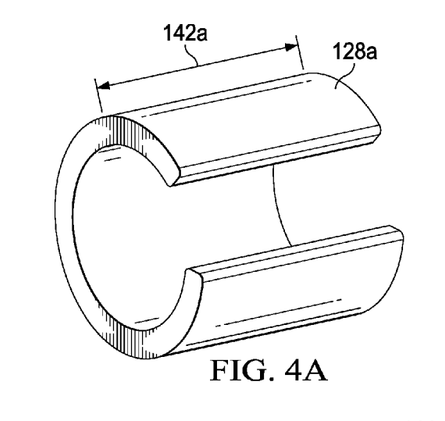
FIG. 4A is a simplified orthographic view illustrating an embodiment of a portion of a hinge, in accordance with one embodiment of the present disclosure.
Figure 4B:
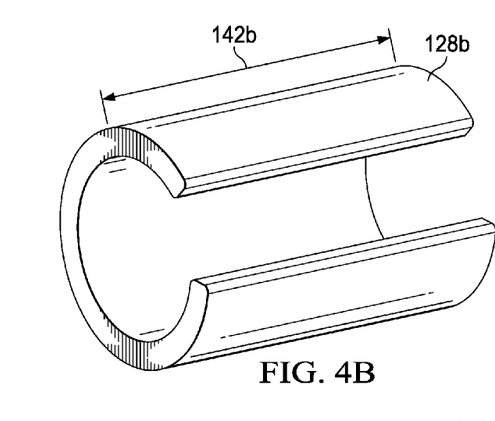
FIG. 4B is a simplified orthographic view illustrating an embodiment of a portion of a hinge, in accordance with one embodiment of the present disclosure.

Turning to FIG. 4A, FIG. 4A is a simplified orthographic view illustrating an embodiment spring clip 128a, in accordance with one embodiment of the present disclosure. As illustrated in FIG. 4A, spring clip 128a can have a width 142a. Turning to FIG. 4B, FIG. 4B is a simplified orthographic view illustrating an embodiment spring clip 128b, in accordance with one embodiment of the present disclosure. As illustrated in FIG. 4B, spring clip 128b can have a width 142b. Width 142b is different than width 142a. Spring clip 128 can have different widths as shown with spring clip 128a having width 142a and spring clip 128b having width 142b. A plurality of spring clips can have a plurality of widths to create different amounts of tension for hinge 106.

Figure 5A:
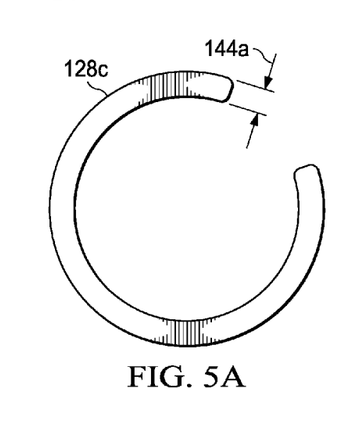
FIG. 5A is a simplified orthographic view illustrating an embodiment of a portion of a hinge, in accordance with one embodiment of the present disclosure.
Figure 5B:
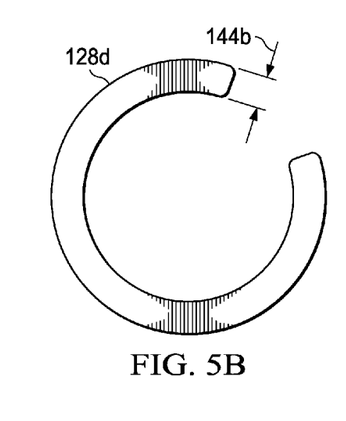
FIG. 5B is a simplified orthographic view illustrating an embodiment of a portion of a hinge, in accordance with one embodiment of the present disclosure.

Turning to FIG. 5A, FIG. 5A is a simplified orthographic view illustrating an embodiment spring clip 128c, in accordance with one embodiment of the present disclosure. As illustrated in FIG. 5A, spring clip 128c can have a thickness 144a. Turning to FIG. 5B, FIG. 5B is a simplified orthographic view illustrating an embodiment spring clip 128d, in accordance with one embodiment of the present disclosure. As illustrated in FIG. 5B, spring clip 128d can have a thickness 144b. Thickness 144b is different than thickness 144a. Spring clip 128 can have different thicknesses as shown with spring clip 128c having thickness 144a and spring clip 128d having thickness 144b. A plurality of spring clips can have a plurality of thicknesses to create different amounts of tension for hinge 106. Using different spring clips with varying widths and thicknesses can allow for a desired tension for hinge 106.

Figure 6:
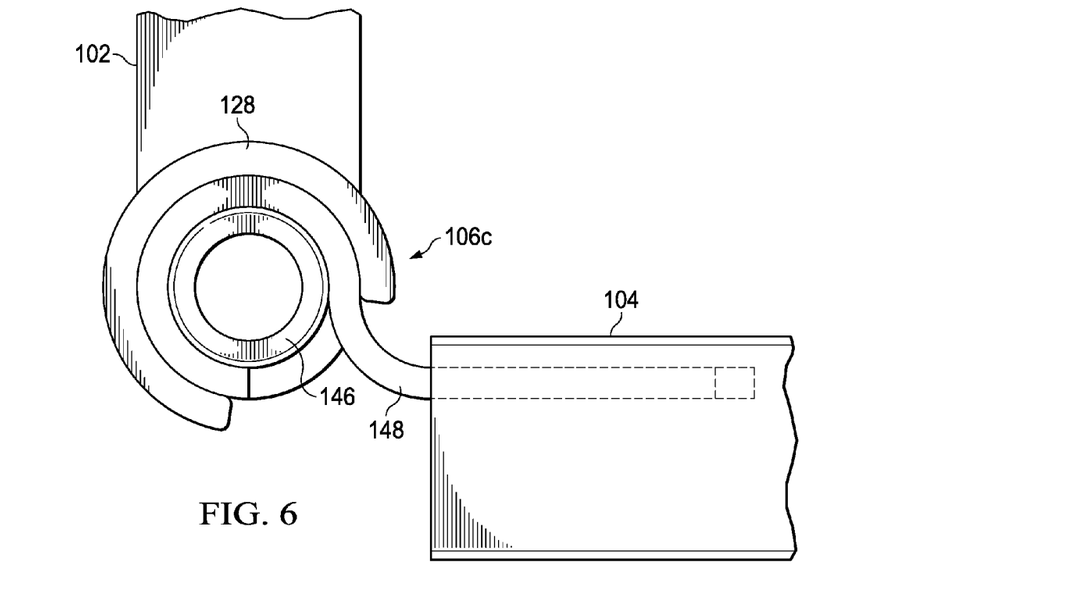
FIG. 6 is a simplified orthographic view illustrating an embodiment of a portion of a hinge, in accordance with one embodiment of the present disclosure.

Turning to FIG. 6, FIG. 6 is a simplified block diagram side view of a hinge 106c in accordance with one embodiment of the present disclosure. Hinge 106c can include spring clip 128, a first housing securing member 148, and an axis of rotation 146. Depending on the width and thickness of spring clip 128, spring clip 128 can apply varying degrees of friction to allow the rotation of first housing 102 relative to second housing 104 to be within a predetermined tolerance.

Figure 7:
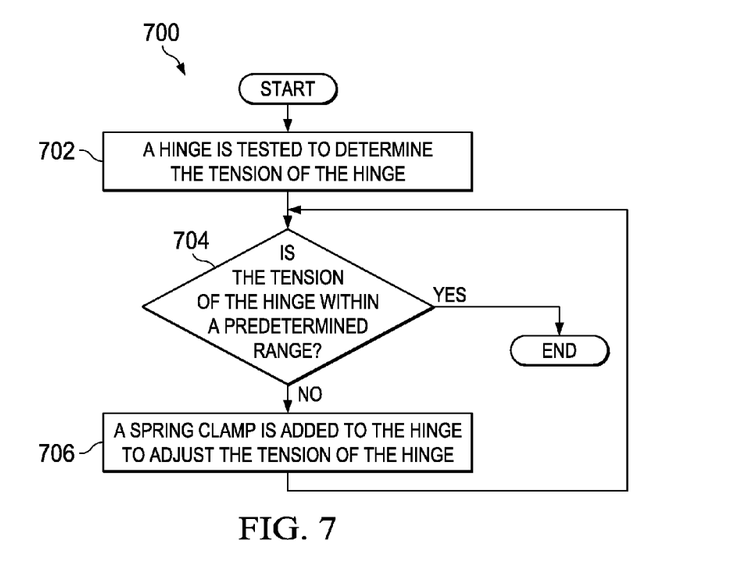
FIG. 7 is a simplified a simplified flow diagram illustrating potential operations associated with one embodiment of the present disclosure.

Turning to FIG. 7, FIG. 7 is an example flowchart illustrating possible operations of a flow 700 that may be associated with a wrap end hinge, in accordance with an embodiment. At 702, a hinge is tested to determine the tension of the hinge. At 704, the system determines if the tension of the hinge is within a predetermined range. If the hinge is within a predetermined range, then the process stops. If the tension of the hinge is not within a predetermined range, then a spring clamp is added to the hinge to adjust the tension of the hinge, as in 706. At 704, the system again determines if the tension of the hinge is within a predetermined range. If the tension of the hinge is still not within a predetermined range, then a (new or additional) spring clamp is added to the hinge to adjust the tension of the hinge, as in 706, and the system again determines if the tension of the hinge is within a predetermined range, as in 704.

It is imperative to note that all of the specifications, dimensions, and relationships outlined herein (e.g., height, width, length, materials, etc.) have only been offered for purposes of example and teaching only. Each of these data may be varied considerably without departing from the spirit of the present disclosure, or the scope of the appended claims. The specifications apply only to one non-limiting example and, accordingly, they should be construed as such. In the foregoing description, example embodiments have been described. Various modifications and changes may be made to such embodiments without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes and Examples

Example A1 is hinge that can include a first body coupled to a first housing, a second body coupled to a second housing, a hinge rod, and a spring clip on an outside diameter of the hinge rod, wherein the spring clip is configured to increase the torque of the hinge.

In Example A2, the subject matter of Example A1 may optionally include where the spring clip is configured to increase the torque of the hinge and allow the hinge to be within a predetermined tolerance.

In Example A3, the subject matter of any of the preceding 'A' Examples can optionally include where the spring clip is coupled to the hinge during manufacturing of the hinge.

In Example A4, the subject matter of any of the preceding 'A' Examples can optionally include where the hinge is a low profile hinge.

In Example A5, the subject matter of any of the preceding 'A' Examples can optionally include where the hinge can rotate about three hundred and sixty degrees.

In Example A6, the subject matter of any of the preceding 'A' Examples can optionally include where the hinge is a wrap end hinge.

Example M1 is a method that includes determining that a torque for a hinge does not satisfy a predetermined tolerance and coupling a spring clip to an outside diameter of the hinge to cause a first increase in the torque for the hinge.

In Example M2, the subject matter of any of the preceding 'M' Examples can optionally include determining that the spring clip does not increase the torque for the hinge sufficient to satisfy the predetermined tolerance, and replacing the spring clip with a second spring clip to cause a second increase the in the torque for the hinge.

In Example M3, the subject matter of any of the preceding 'M' Examples can optionally include where a thickness of the spring clip is different than a second thickness of the second spring clip.

In Example M4, the subject matter of any of the preceding 'M' Examples can optionally include where a width of the spring clip is different than a second width of the second spring clip.

In Example M5, the subject matter of any of the preceding 'M' Examples can optionally include where material properties for the spring clip are different than material properties for the second spring clip.

In Example M6, the subject matter of any of the preceding 'M' Examples can optionally include where different force spring clips can be used to control torque and friction of the hinge.

In Example M7, the subject matter of any of the preceding 'M' Examples can optionally include where the hinge is a low profile hinge.

In Example M8, the subject matter of any of the preceding 'M' Examples can optionally include where the hinge can rotate about three hundred and sixty degrees.

In Example M9, the subject matter of any of the preceding 'M' Examples can optionally include where the hinge is a wrap end hinge.

Example AA1 can include an electronic device that includes a first housing, a second housing, and a hinge. The hinge rotatably couples the first housing and the second housing and the hinge includes a first body coupled to the first housing, a second body coupled to the second housing, a hinge rod, and a spring clip located on an outside diameter of the hinge rod, where the spring clip is configured to increase the torque of the hinge.

In Example AA2, the subject matter of any of the preceding 'AA' Examples can optionally include where the spring clip is configured to increase the torque of the hinge and allow the hinge to be within a predetermined tolerance.

In Example AA3, the subject matter of any of the preceding 'AA' Examples can optionally include where the hinge is a low profile hinge.

In Example AA4, the subject matter of any of the preceding 'AA' Examples can optionally include where the hinge can rotate about three hundred and sixty degrees.

In Example AA5, the subject matter of any of the preceding 'AA' Examples can optionally include where the hinge is a wrap end hinge.

What is claimed is:

1. A hinge, comprising:
   a first body coupled to a first housing using a first housing coupling mechanism;
   a first hinge rod, wherein the first housing coupling mechanism extends from the first hinge rod;
   a second body coupled to a second housing using a second housing coupling mechanism; and
   a spring clip, wherein the spring clip includes a first end and a second end with a gap between the first end and the second end, wherein the spring clip was positioned over an outside diameter of the first hinge rod such that the first housing coupling mechanism extends through the gap and between the first end and the second end, wherein the spring clip is configured to increase torque of the hinge.

2. The hinge of claim 1, wherein the spring clip is configured to increase the torque of the hinge and allow the hinge to be within a predetermined tolerance.

3. The hinge of claim 1, wherein the spring clip is coupled to the hinge during manufacturing of the hinge.

4. The hinge of claim 1, wherein the hinge is a low profile hinge.

5. The hinge of claim 1, wherein the hinge can rotate about three hundred and sixty degrees.

6. The hinge of claim 1, wherein the hinge is a wrap end hinge.

7. An electronic device comprising:
   a first housing;
   a second housing; and
   a hinge, wherein the hinge rotatably couples the first housing and the second housing and the hinge includes:
   a first body coupled to the first housing using a first housing coupling mechanism;
   a first hinge rod, wherein the first housing coupling mechanism extends from the first hinge rod;
   a second body coupled to the second housing using a second housing coupling mechanism; and
   a spring clip, wherein the spring clip includes a first end and a second end with a gap between the first end and the second end, wherein the spring clip was positioned over an outside diameter of the first hinge rod such that the first housing coupling mechanism extends through the gap and between the first end and the second end, wherein the spring clip is configured to increase torque of the hinge.

8. The electronic device of claim 7, wherein the spring clip is configured to increase the torque of the hinge and allow the hinge to be within a predetermined tolerance.

9. The electronic device of claim 7, wherein the hinge is a low profile hinge.

10. The electronic device of claim 7, wherein the hinge can rotate about three hundred and sixty degrees.

11. The electronic device of claim 7, wherein the hinge is a wrap end hinge.

* * * * *